United States Patent
Dube' et al.

(10) Patent No.: US 6,434,157 B1
(45) Date of Patent: Aug. 13, 2002

(54) MODBUS PLUS ETHERNET BRIDGE

(75) Inventors: Denis W. Dube', Pelham; Andrew G. Swales, Windham, both of NH (US); Cynthia Davies, Lowell, MA (US)

(73) Assignee: Schneider Automation, Inc., North Andover, MA (US)

( * ) Notice: Subject to any disclaimer, the term of this patent is extended or adjusted under 35 U.S.C. 154(b) by 0 days.

(21) Appl. No.: 09/167,251

(22) Filed: Oct. 6, 1998

(51) Int. Cl.$^7$ .............................................. H04L 12/28
(52) U.S. Cl. ...................................... 370/401; 370/402
(58) Field of Search ................................ 370/401–405

(56) References Cited

U.S. PATENT DOCUMENTS

| | | |
|---|---|---|
| 3,971,000 A | 7/1976 | Cromwell |
| 4,319,338 A | 3/1982 | Grudowski et al. |
| 4,688,167 A | 8/1987 | Agarwal |
| 4,845,644 A | 7/1989 | Anthias et al. |
| 4,858,152 A | 8/1989 | Estes |
| 4,897,777 A | 1/1990 | Janke et al. |
| 4,912,623 A | 3/1990 | Rantala et al. |
| 4,937,777 A | 6/1990 | Flood et al. |
| 4,949,274 A | 8/1990 | Hollander et al. |
| 4,953,074 A | 8/1990 | Kametani et al. |
| 4,992,926 A | 2/1991 | Janke et al. |

(List continued on next page.)

FOREIGN PATENT DOCUMENTS

| | | |
|---|---|---|
| DE | 296 00 609 U1 | 3/1997 |
| DE | 441 0 171 C1 | 4/1997 |
| DE | 196 15 093 A1 | 10/1997 |
| EP | 0 542 657 A1 | 5/1993 |
| EP | 0 814 393 A1 | 12/1997 |
| WO | WO 97/18636 | 5/1997 |
| WO | WO 98/53581 | 11/1998 |

OTHER PUBLICATIONS

Groupe Schneider, Modicon Modibus Plus Network BM85 Bridge Multiplexer User's Guide,Aug. 1995.*

When Technology Standards Become Counterproductive, Kenneth C. Crater, President, Control Technology Corporation, Hopkinton, MA dated Jul. 9, 1999, pp. 1–5.

A White Paper State Language for Machine Control, Kenneth C. Crater, President, Control Technology Corporation, Hopkinton, MA dated Jul. 9, 1999, pp. 1–11.

New PC–based Process Control & Data Acquisition Software Integrates Remote Internet Capabilities with Fast Pentium Support, Fred A. Putnam, LabTech President, pp. 1–3.

Aug. 1996 Control Magazine—In The News—Electric Utility Industry Embarks on Automation Overhaul, pp. 1–10.

Jul. 1997 Control Magazine—Magazine Software Review—NT Package Give Plant Access Through the Web, pp. 1–3.

Oct. 1996 Control Magazine—Software Review—Article Archives, pp. 1–2.

(List continued on next page.)

*Primary Examiner*—Melvin Marcelo
*Assistant Examiner*—Ron Abelson
(74) *Attorney, Agent, or Firm*—Michael J. Femal; Larry I. Golden

(57) ABSTRACT

A bridge is disclosed for providing a connection between a MODBUS Plus network and an Ethernet network. The bridge includes a MODBUS circuit board, an Ethernet circuit board, and a CPU. The MODBUS circuit board is operably coupled to the local area network for receiving a message from an originating node having a five-byte routing path field. The CPU is operably connected to the circuit board for extracting a table location in response to a third byte within the routing path field. The Ethernet circuit board is operably connected to the CPU and the Ethernet network for forwarding the message to an IP destination in response to the table location.

26 Claims, 12 Drawing Sheets

U.S. PATENT DOCUMENTS

| | | |
|---|---|---|
| 5,012,402 A | 4/1991 | Akiyama |
| 5,023,770 A | 6/1991 | Siverling |
| 5,047,959 A | 9/1991 | Phillips et al. |
| 5,072,356 A | 12/1991 | Watt et al. |
| 5,072,412 A | 12/1991 | Henderson, Jr. et al. |
| 5,109,487 A | 4/1992 | Ohgomori et al. |
| 5,122,948 A | 6/1992 | Zapolin |
| 5,131,092 A | 7/1992 | Sackmann et al. |
| 5,134,574 A | 7/1992 | Beaverstock et al. |
| 5,151,896 A | 9/1992 | Bowman et al. |
| 5,151,978 A | 9/1992 | Bronikowski |
| 5,157,595 A | 10/1992 | Lovrenich |
| 5,159,673 A | 10/1992 | Sackmann et al. |
| 5,161,211 A | 11/1992 | Taguchi et al. |
| 5,165,030 A | 11/1992 | Barker |
| 5,179,700 A | 1/1993 | Aihara et al. |
| 5,225,974 A | 7/1993 | Mathews et al. |
| 5,245,704 A | 9/1993 | Weber et al. |
| 5,251,302 A | 10/1993 | Weigl et al. |
| 5,283,861 A | 2/1994 | Dangler et al. |
| 5,297,257 A | 3/1994 | Struger et al. |
| 5,307,463 A | 4/1994 | Hyatt et al. |
| 5,321,829 A | 6/1994 | Zifferer |
| 5,349,675 A | 9/1994 | Fitzgerald et al. |
| 5,398,336 A | 3/1995 | Tantry et al. |
| 5,406,473 A | 4/1995 | Yoshikura et al. |
| 5,420,977 A | 5/1995 | Sztipanovits et al. |
| 5,440,699 A | 8/1995 | Farrand et al. |
| 5,446,868 A | 8/1995 | Gardea et al. |
| 5,528,503 A | 6/1996 | Moore et al. |
| 5,598,536 A | 1/1997 | Slaughter, III et al. |
| 5,613,115 A | 3/1997 | Gihi et al. |
| 5,623,652 A | 4/1997 | Vora et al. |
| 5,625,781 A | 4/1997 | Cline et al. |
| 5,699,350 A | 12/1997 | Kraslavsky |
| 5,734,831 A | 3/1998 | Sanders |
| 5,805,442 A | 9/1998 | Crater et al. |
| 5,805,816 A * | 9/1998 | Picazo et al. .......... 395/200.53 |
| 5,862,391 A | 1/1999 | Salas et al. |
| 5,950,006 A | 9/1999 | Crater et al. |
| 5,975,737 A | 11/1999 | Crater et al. |
| 5,982,362 A | 11/1999 | Crater et al. |
| 5,997,167 A | 12/1999 | Crater et al. |

OTHER PUBLICATIONS

ICS Instrumentation & Control Systems—Windows NT for real–time control: Which way to go?—ICS Magazine, pp. 1–8.
I&CS Jul. 1999—Special Report Software—Software: Open source OSs, objects, Web–based communications challenge status quo, (Wayne Labs, Senior Technical Editor), pp. 24–49.
Landis & Staefa MS 2000, pp. 1–2.
Landis & Staefa Standards and Open Protocols Integration System Architecture, p. 1.
Annabooks Bookstore, Programming and Interfacing the 8051, by Sencer Yeralan and Asutosh Ahluwalia, pp. 1–2.
SoftPLC Corporation—Java Support in SoftPLC Corp. Products, pp. 1–5.
Mach J. Company, MachJ, an enbeddable, clean room Java Virtual Machine, p. 1.
SoftPLC Corporation—The History of Programmable Controllers, Looking Back From the Year 2000 A.D. (Or, How Computers Replaced Proprietary PLC'S), pp. 1–7.
SoftPLC Corporation—TOPDOC: Advanced PLC program development & documentation software, pp. 1–12.
Control Engineering Online Magazine Articles (Jul. 1998)— No, that's not a PC, it's a PLC, pp. 1–2.
Rockwell International Corporation, Allen–Bradley Introduces PLC–5/80E Controller for Ethernet Communication Networks.
Rockwell Automation—Search Results, pp. 1–2.
Rockwell International Corporation, Vision & Direction, The Direction of Automation Systems, pp. 1–4.
Rockwell International Corporation, Vision & Direction, The Role of Open Systems, pp. 1–4.
Rockwell International Corporation—Vision & Direction— The Direction of Automation Systems—Emergence of Application–Specific Control Solutions, pp. 1–2.
Rockwell International Corporation—Vision & Direction— The Direction of Automation Systems—The New Factory Worker, pp. 1–2.
Rockwell International Corporation, Vision & Direction, Control System Deliverables —The Next Step, pp. 1–2.
Rockwell International Corporation, Vision & Direction, Conclusion & Acknowledgments, pp. 1–2.
Rockwell International Corporation—Choices—Perspectives on the Future of Automation Control, p. 1.
Rockwell International Corporation—Allen–Bradley—Networks—Ethernet for Industrial Control—An Ethernet White Paper—Apr. 21, 1998, pp. 1–13.
Rockwell International Corporation—Automation Systems Control—General13 World–Class Automation Systems from Allen–Bradley, Last Updated: May 7, 1998, pp. 1–12.
PC Quest, Dec. '97—Point, click, Control—C–Programmable controllers take the pain out of embedded control, pp. 1–2.
berthel—automation with imagination—PCI 100—Programmable logic controller for SIMATIC/IBM IPC, pp. 1–3.
YAHOO! Personalized Search Results for programmable logic controller internet access, pp. 1–3.
SIEMENS—SIMATIC report 1/97—New in the SIMATIC Library, pp. 1–2.
Control Magazine Aug. 1998—Field Test—Dynamic Software Makes Control Integration Easier, pp. 1–2.
Design and Reuse Web Site—EDTN Network—Analyze IP Database Content—Analyse Reuse Blocks per taxonomy tree, pp. 1–10.
Engineering Information, Inc.—Ei CPX Web [1990–94].
"Internet Protocol, Darpa Internet Program, Protocol Specification—RFC:791," Defense Advanced Research Projects Agency, Sep. 1981.
"Transmission Control Protocol, Darpa Internet Program, Protocol Specification—RFC:793," Defense Advanced Research Projects Agency, Sep. 1981.
"Open MODBUS/TCP Specification," A. Swales, Sep. 3, 1997.
"[comp.unix.programmer] Unix–Socket–FAQ For Network Programming," Vic Metcalfe, Andrew Gierth and other contributors, Jan. 22, 1998.
"TCP/IP Illustrated, vol. 2, The Implementation," Gary R. Wright, W. Richard Stevens, 1997.
"Winsock 2 Information," Bob Quinn, 1995–1998 (last updated Dec. 5, 1998).
Website Information of PROFIBUS: Technical Overview.
Website Information of ODVA—The Open DeviceNet's Vendor Association.
Website of PROFIBUS International—Welcome Page.
"Ethernet Base Gateway Product," AEG–Modicon, published 1991.

"Modicon Modbus Plus Network BM85 Bridge Multiplexer User's Guide," Groupe Schneider, Aug. 1995.

"Modicon Modbus Plus Network Planning and Installation Guide," AEG Schneider Automation, Apr. 1996.

"Open Modbus/TCP Specification," A. Swales, Sep. 3, 1997.

"MEB Installation and Programming Manual," Niobara Research and Development Corporation, Sep. 24, 1997.

"MEB–TCP Installation and Programming Manual," Niobara Research and Development Corporation, Oct. 1, 1997.

Abstract of "Implementing distributed controls for FMC's using Internet utilities," S. S. Jagdale and N. Merchant; Computers of Industrial Engineering, vol. 31 No. 1–2, p. 87–90; Oct., 1996 (UK).

Abstract of "Process Control takes to the Net," Greg Paula, Mechanical Engineering vol. 118 No. 12 Dec. 1996, p. 55.

Abstract of "Remote interrogation and control of sensors via the internet," Peter L. Furh and Euan F. Mowat; Sensors, vol. 12 No. 12, 6 pp; Dec. 1995.

Abstract of "Progress control takes to the Net," G. Paula; Mechanical Engineering, vol. 118, No. 12, p. 55, Dec., 1996.

Abstract of "Implementation of CAN/CAN bridges in distributed environments and performance analysis of bridged CAN systems using SAE benchmark," H. Ekiz, A. Kutlu and E. T. Powner; Conference Paper, IEEE Southeastern '97, Engineering the new energy, IEEE, p. 185–7, 1996.

Abstract of "Managing interdisciplinary project teams through the Web," R. E. Goodman and P. Chinowsky; Conference Paper, WebbNet 96—World Conference of the Web Society, pp. 180–185, 1996.

Abstract of "Learning environment for a process automation system using computer networks," J. Lindfors, L. Yliniemi and K. Leivska; Conference Paper, Step τ—Genes, Nets and Symbols, pp. 137–143, 1996 (Finland).

Abstract of "Distributed agent systems for intelligent manufacturing,"D. H. Norrie and B. R. Gaines; Canadian Artificial Intelligence, No. 40, p. 31–3, Autumn 1996 (Canada).

Abstract of Proceedings of AutoFact 1995 Conference, "Today's Automated, Integrated Factory," Soc. Manuf., Eng., Dearborn, MI; 1995.

Abstract of "The ECOSSE Control HyperCourse," C. M. Merrick and J. W. Ponton; Computers & Chemical Engineering, vol. 20, Part B, p. S 1353–8, 1996 (UK).

Abstract of "Chemical–better batch controls," T. Crowl; Contorl & Instrumentation, vol. 28, No. 5, p. 53–4, May 1996 (UK).

Abstract of "Industrial software does 32–bit Windows, prepares for the net," W. Labs; I 8CS, vol. 69, No. 3, p. 23–6, 31–4, Mar. 1996, USA.

Abstract of "A case study of international remote machining;" G. C. I. Lin and Kao Yung–Chou; Conference Paper, Proc. SPIE–Int. Soc. Opt. Eng., vol. 2620, p 553–60, 1995.

Abstract of "Standardization of long–distance protocols," R. Dinges; Journal Paper, Generation Changes in Network Conductor Systems, ITG—Fachberichte, vol. 134, p. 97–113, 1995 (West Germany).

Abstract of "Proceedings of AutoFact Conference," Soc. Manuf. Eng., , 684 pp., Dearborn, MI; 1993.

Abstract of "Control system design V. Communications orchestrate process control," F. Glow; In Tech, vol. 36, No. 9, p. 68–74, Sep. 1989.

Abstract of "Functions and characteristics of local networks adapted to industrial applications," J. Morlais; Electronique Industrielle, No. 97, p. 56–63, Nov. 15, 1985; France.

Abstract of "Intelligent supervisory control of submerged–arc furnaces," Markus A. Reuter, Carla Pretorius, Chloe West, Peter Dixon and Morne Oosthuizen, JOM vol. 48, No. 12, Dec. 1996, p. 49–51.

Abstract of "Simulation on the integration of process control systems of rolling mill plants through standard networks, "Choo Young Yeol, Hwang Hwa Won and Kim Cheeha, Proceedings of the Industrial Computing, Conference, Instrument Society of America, Research Triangle Park, NC, USA, P 1–14; vol. 6, No. 1, 1996.

Abstract of "Environment waste control digest," Clayton H. Billings; Public Works vol. 127 No. 7, 6 pp, Jun., 1996.

Abstract of "Experiments in tele–handling and tele–machining at the macro and micro scales, using the internet for operational environment transmission," Mamoru Mitsuishi, Toshio Hori, Tomaharu Hikita, Masao Teratani, Takuro Watanabe, Hirofumi Nakanishi and Bruce Kramer; IEEE International Conference on Intelligent Robots and Systems vol. 2, 1995.

Abstract of "A phototyping and reverse engineering system for mechanical parts–on–demand on the national network," Fred Hansen, Elias Pavlakos, Eric Hoffman, Takeo Kanade, Raj Reddy, Paul Wright; Journal of Manufacturing Systems, vol. 12 No. 4, p. 269–281; 1993.

Abstract of "Mathematical model and optimization of furfural treating process," Tao Peng, Jinshou Yu and Huihe Shao; Huadong Huagong Xueyuan Xuebao/Journal of East China Institute of Chemical Technology vol. 17 No. 1, p. 99–104; Feb. 1991.

Abstract of User's Aspect of Telecommunication and Information Processing in Plant Factory; Hashimoto Yasushi (1); Journal of the Institute of Electronics, Information and Communication Engineers, vol. 78, No. 5, p. 475–81, Fig. 3, Ref. 7, 1995. (Japan).

Abstract of "High–efficient application technology of DCS from the viewpoint of users," Oka Norihito (1); Narita Tsutomu (1); (1) Yamatake–Honeywell Co., Ltd.; Otomeshon, vol. 40, No. 2, p. 24–28, Fig. 5, Part 2, 1995. (Japan).

Abstract of Users' experience with software tools for process integration. General results; Stougie, L.; Roeterink, H.J.H.; Van Wijk, A.; Stikkelman, R.M.; Nov. 1996.

Abstract of "Integrated design and process technology. vol. 1;" Cooke, D.; Kraemer, B.J.; Sheu, P.C.Y.; Tsai, J.P.; Mittermeir, R.; Society for Design and Process Science, p. 51–57; 1996. (USA).

Abstract of "Integrated design and process technology. vol. 2;" Tanik, M.M.; Bastani, F.B.; Gibson, D.; Fielding, P.J.; Society for Design and Process Science, p. 423–430, 1996. (USA).

Abstract of "Integrated design and process technology. vol. 2" Tanik, M.M.; Bastani, F.B.; Gibson, D.; Fielding, P.J.; Society for Design and Process Science, p. 306–312, 1996.

Abstract of "Need low–cost networking consider DeviceNet," W. H. Moss; InTech vol. 43:11; p. 30–31, Nov. 1996.

"Plastic Car Bodies Pass the Crash Test," mechanical engineering; vol. 118, No. 12; Dec. 1996.

"Remote Interrogation and Control of Sensors via the Internet," Sensors and Systems; Peter L. Fuhr and Euan F. Mowat; University of Vermont; pp. 25–30; Dec., 1999.

* cited by examiner

| PATH TYPE | OPENED IN NODE | OPENED FOR MODBUS COMMAND |
|---|---|---|
| DATA MASTER (DM) | ORIGINATOR | DATA ACCESS |
| DATA SLAVE (DS) | DESTINATION | DATA ACCESS |
| PROGRAM MASTER (PM) | ORIGINATOR | PROGRAMMING |
| PROGRAM SLAVE (PS) | DESTINATION | PROGRAMMING |

| EXCEPTION CODE (HEXADECIMAL) | MEANING |
|---|---|
| 01 | ILLEGAL FUNCTION |
| 02 | ILLEGAL DATA ADDRESS |
| 03 | ILLEGAL DATA VALUE |
| 04 | UNEXPECTED FAILURE DURING COMMAND EXECUTION |
| 05 | ACK - - REQUESTED OPERATION IS IN PROGRESS |
| 06 | BUSY - - NOT READY TO PERFORM REQUESTED OPERATION |
| 07 | NAK - - REQUESTED OPERATION REJECTED |
| 08 | COULD NOT OPEN MODBUS PLUS PATH |
| 09 | ERROR DURING MODBUS PLUS SEND |
| 0A | ERROR DURING MODBUS PLUS REPLY |

*Figure 3*

| FUNTION CODE (DECIMAL) | COMMAND NAME |
|---|---|
| 1 | READ DISCRETE OUTPUT STATUS (0xxxx) |
| 2 | READ DISCRETE INPUT STATUS (1xxxx) |
| 3 | READ OUTPUT REGISTER (4xxxx) |
| 4 | READ INPUT REGISTER (3xxxx) |
| 5 | FORCE SINGLE COIL (0xxxx) |
| 6 | PRESET SINGLE REGISTER (4xxxx) |
| 7 | READ EXCEPTION STATUS |
| 8  SUBFUNCTION 21 | GET/CLEAR NETWORK STATISTICS |
| 15 | FORCE MULTIPLE COILS (0xxxx) |
| 16 | PRESET MULTIPLE REGISTERS  (4xxxx) |
| 17 | REPORT SLAVE ID |

*Figure 4*

| DESTINATION INDEX (DEST_IDX) | MODBUS PLUS ROUTING PATH |
|---|---|
| 1 ... 64 | 1.0.0.0.0 ... 64.0.0.0.0 |
| 65 ... 128 | 2.1.0.0.0 ... 2.64.0.0.0 |
| 129 ... 192 | 3.1.0.0.0 ... 3.64.0.0.0 |
| 193 ... 249 | 3.2.1.0.0 ... 3.2.57.0.0 |

| MB+ MAPPING | | TCP MAPPING | |
|---|---|---|---|
| MBP_1 | 1.0.0.0.0 | TCP_1 | 205.167.7.1 |
| MBP_2 | 2.0.0.0.0 | TCP_2 | 205.167.7.2 |
| MBP_3 | 3.0.0.0.0 | TCP_3 | 205.167.7.3 |
| MBP_4 | 4.0.0.0.0 | TCP_4 | 205.167.7.4 |
| MBP_5 | 5.0.0.0.0 | TCP_5 | 205.167.7.5 |
| MBP_6 | 6.0.0.0.0 | TCP_6 | 205.167.7.6 |
| MBP_7 | 7.0.0.0.0 | TCP_7 | 205.167.7.7 |
| MBP_8 | 8.0.0.0.0 | TCP_8 | 205.167.7.8 |
| MBP_9 | 9.0.0.0.0 | TCP_9 | 205.167.7.9 |
| MBP_10 | 10.0.0.0.0 | TCP_10 | 205.167.99.99 |
| MBP_11 | 11.0.0.0.0 | TCP_11 | 205.167.7.11 |

IP ADDRESS: 205.167.7.65
NET MASK: 255.255.255.0
NAME SERVER: 205.167.7.2
GATEWAY: 205.167.7.2
DOMAIN:
IDLE TIMEOUT: 300

ESC EXIT
TAB NEXT WIN; SHIFT TAB PREV WIN; UP, DOWN, PGUP, PGDOWN, SCROLL, F1 GOTO F2 HELP

*Figure 14*

MODBUS PLUS ETHERNET BRIDGE

TECHNICAL FIELD

The present invention relates to bridges for providing a connection between local area networks, and in particular to a bridge that provides a connection between a MODBUS Plus network and an Ethernet network.

BACKGROUND OF THE INVENTION

Local area networks are widely used for communicating between data processing systems and peripherals such as, for example, those disclosed by U.S. patent application Ser. No. 09/036,565, filed Mar. 9, 1998, now U.S. Pat. No. 6,016, 523 and incorporated herein by reference, and German Patent No. DE 196 15 093 A1, filed Apr. 17, 1996, and also incorporated herein by reference.

As is well known by those skilled in the art, local area networks use at least one of many network protocols for passing data along the network. Such widely used network protocols include the MODBUS Plus Protocol and the Ethernet Transport Control Protocol/Internet Protocol (TCP/IP).

The MODBUS Application Protocol used for sending MODBUS messages over TCP/IP. The MODBUS Application Protocol (MBAP), is a layer-7 protocol providing peer-to-peer communication between Programmable Logic Controllers and other host-based nodes on a local area network. Collectively, these nodes implement all or part of a control application widely used for industrial applications in the automotive, tire and rubber, food and beverage, and utilities industries to name a few.

MODBUS protocol transactions are typical request-response message pairs. MODBUS requests contain function codes representing several classes of service including data access, online programming, and program download and upload classes. MODBUS responses can be acknowledgments with and without data, or non-acknowledgments with error information. The MODBUS protocol is described in a reference manual entitled MODBUS Protocol Reference Guide, publication PI-MBUS-300, incorporated herein by reference.

Because of the widespread use of MODBUS Plus and TCP/IP Ethernet networks, there is a need to have these networks communicate with each other. To the knowledge of the inventors, no bridges are available for facilitating such communication path(s). Accordingly, the present invention satisfies this need.

SUMMARY OF THE INVENTION

The inventive bridge disclosed herein provides a transparent multipath connection between Ethernet host applications and a MODBUS Plus industrial network. The bridge functions as an addressable node on each network, managing the Ethernet and MODBUS Plus protocols and translating messages between the network applications in both directions.

Ethernet hosts can establish connections to the bridge and send messages intended for MODBUS Plus nodes. The bridge accepts the messages, creates internal paths for the MODBUS Plus transactions, waits for the MODBUS Plus token frame, and forwards the messages to the destination nodes. It receives the data responses from the MODBUS Plus nodes, returns them to the Ethernet hosts, and closes the paths.

Messages sent to the bridge on either Ethernet or MODBUS Plus contain an embedded MODBUS message, consisting of a function code and additional information such as register addresses and data. The bridge uses the MODBUS function code to determine the type of internal path required for the transaction, and opens a path if one is available. If a path is not available, a MODBUS error code (exception code) is returned by the bridge to the requesting node.

The bridge provides MODBUS Data Master, Data Slave, Program Master and Program Slave paths as defined by the MODBUS function codes in the messages. In one embodiment, the bridge supports up to eight concurrent Data paths and eight concurrent Program paths. Moreover, the bridge supports full five-byte MODBUS Plus routing, enabling transactions through MODICON BP85 MODBUS Plus bridges to MODBUS Plus nodes on up to three networks beyond the Ethernet bridge.

The bridge maintains two internal mapping tables that provide address mapping between Internet Protocol addresses (i.e., 255.255.255.255) and MODBUS Plus path addresses (i.e., 64.64.64.64.64). The user can define the mapping at a local keyboard and monitor connection, using a configuration utility that is stored in the bridge. Mapping tables can also be downloaded by Hypertext Transfer Protocol (HTTP) from the Ethernet host to the bridge. If neither method is used, the bridge provides default mapping tables.

The user can assign the bridge's Internet Protocol (IP) address through a Bootstrap Protocol (BOOTP) server using the bridge's Media Access Control (MAC) address, or locally by means of the bridge's configuration utility. The bridge's MODBUS Plus address is assigned in hardware switches on the bridge's MODBUS Plus circuit board.

The bridge can be mounted on a vertical panel or horizontal shelf. Its rear panel has connectors for the networks and for operating power. Also, light emitting diode (LED) indicators are provided for power, Ethernet communication, and MODBUS Plus communication status.

BRIEF DESCRIPTION OF THE DRAWINGS

FIG. 3 is a table summarizing the MODBUS function codes which open Data Master and Data Slave paths;

FIG. 4 is a table summarizing the MODBUS exception codes that may be returned by the present invention to a node originating a message;

FIG. 14 illustrates an example of a typical default TCP mapping, with one custom routing entry made by the user;

DETAILED DESCRIPTION

Figures 1, 2:
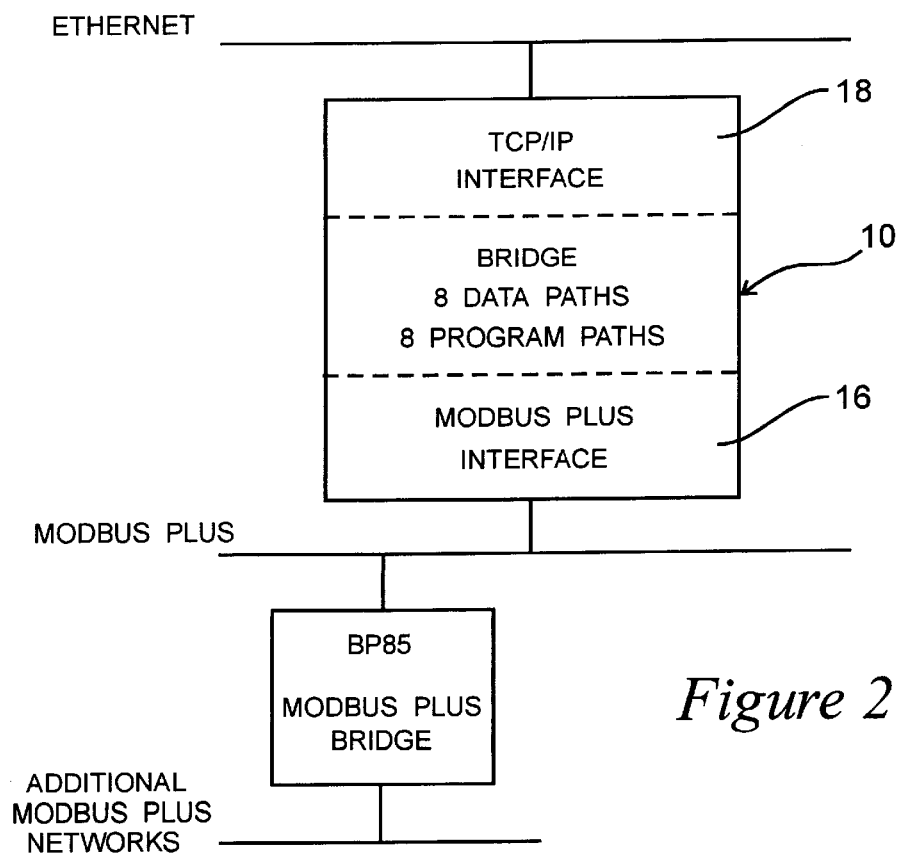
FIG. 1 is a table summarizing the four possible types of MODBUS Plus paths supported by the present invention.
FIG. 2 is a block diagram of a bridge in accordance with the present invention connected between an Ethernet network and a MODBUS Plus network.
Figure 5:
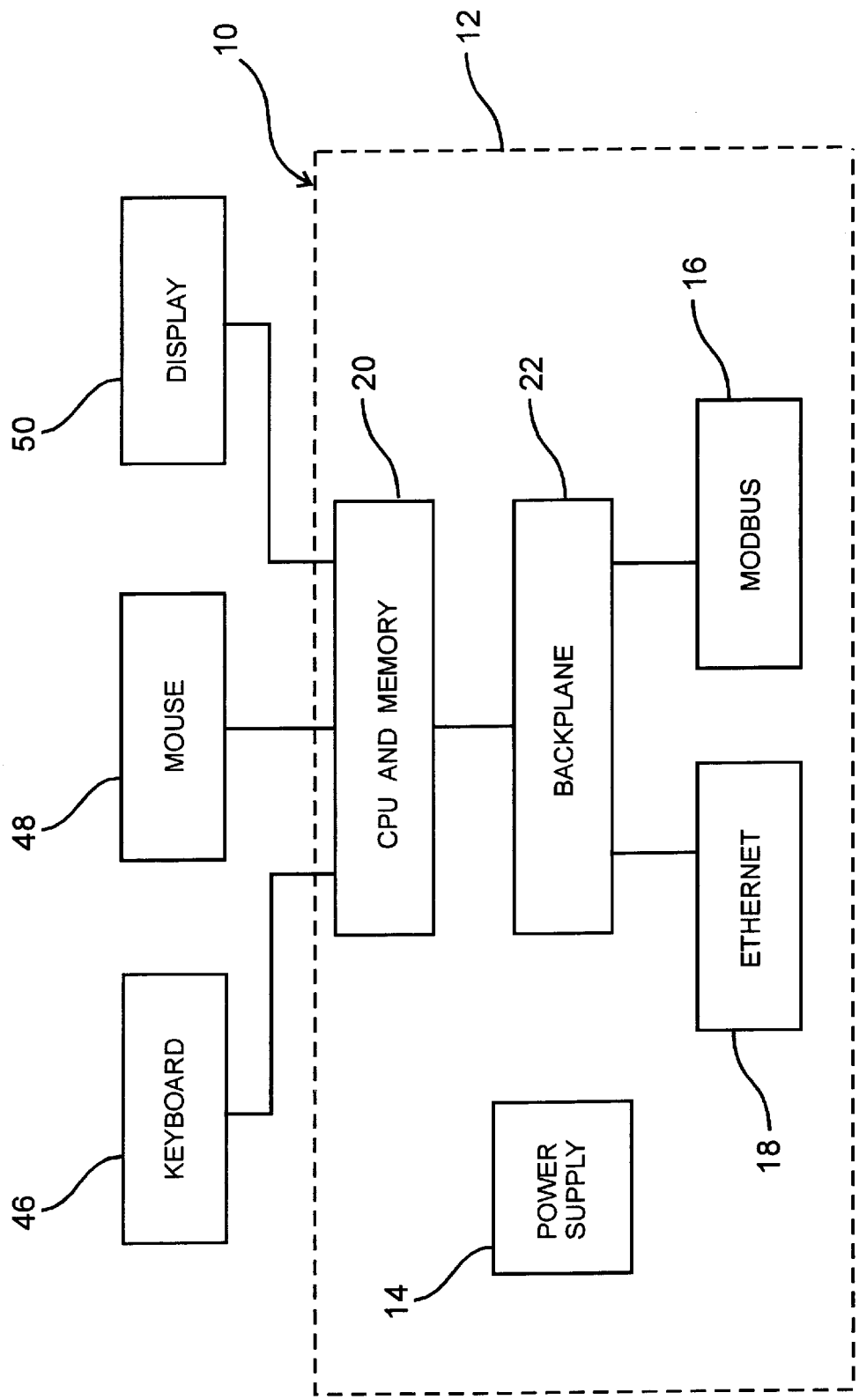
FIG. 5 is a simplified block diagram of the bridge of FIG. 2.
Figure 6:
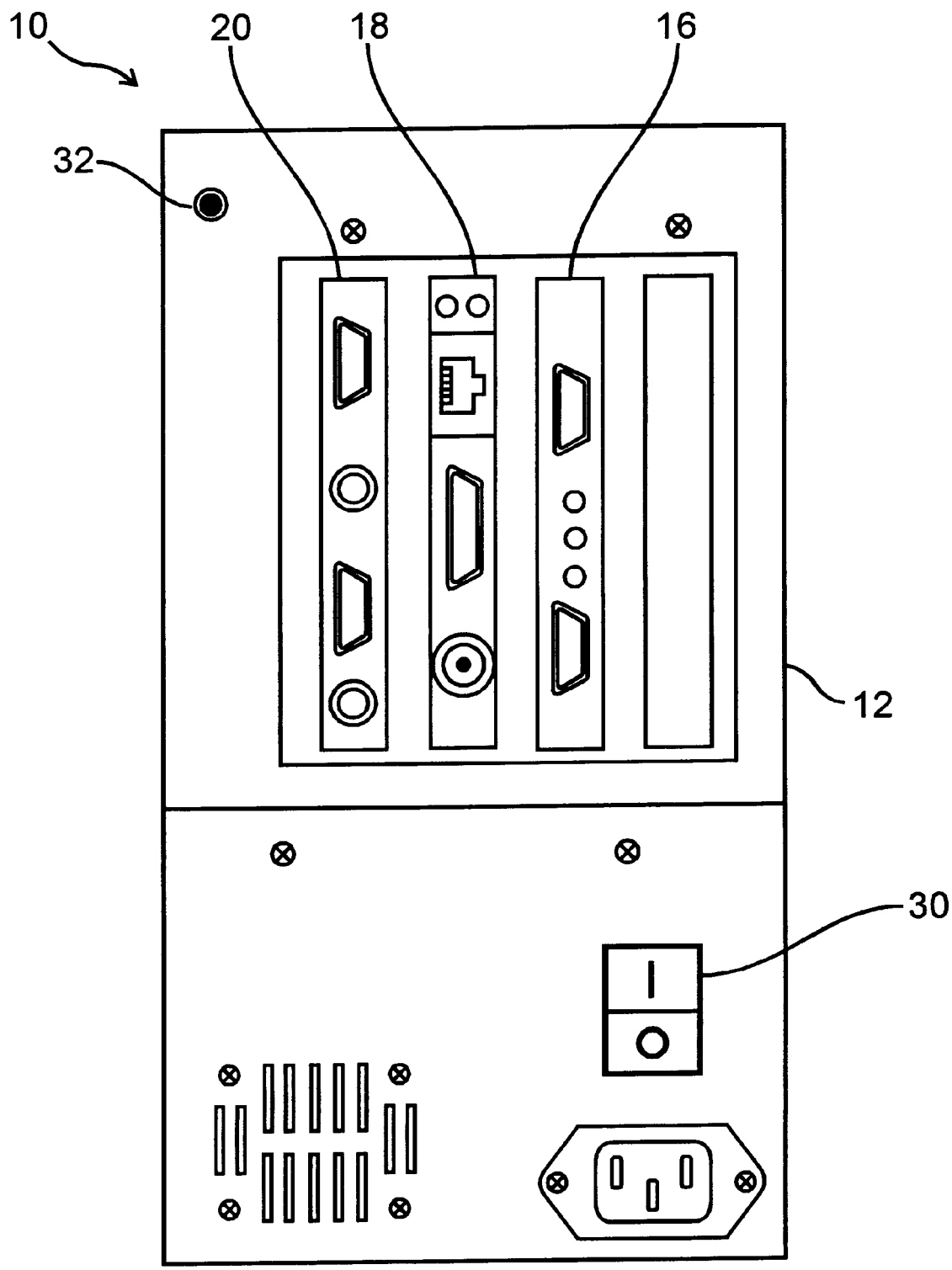
FIG. 6 is an elevated rear view of a bridge in accordance with the block diagram of FIG. 5 having a connector panel.
Figure 7:
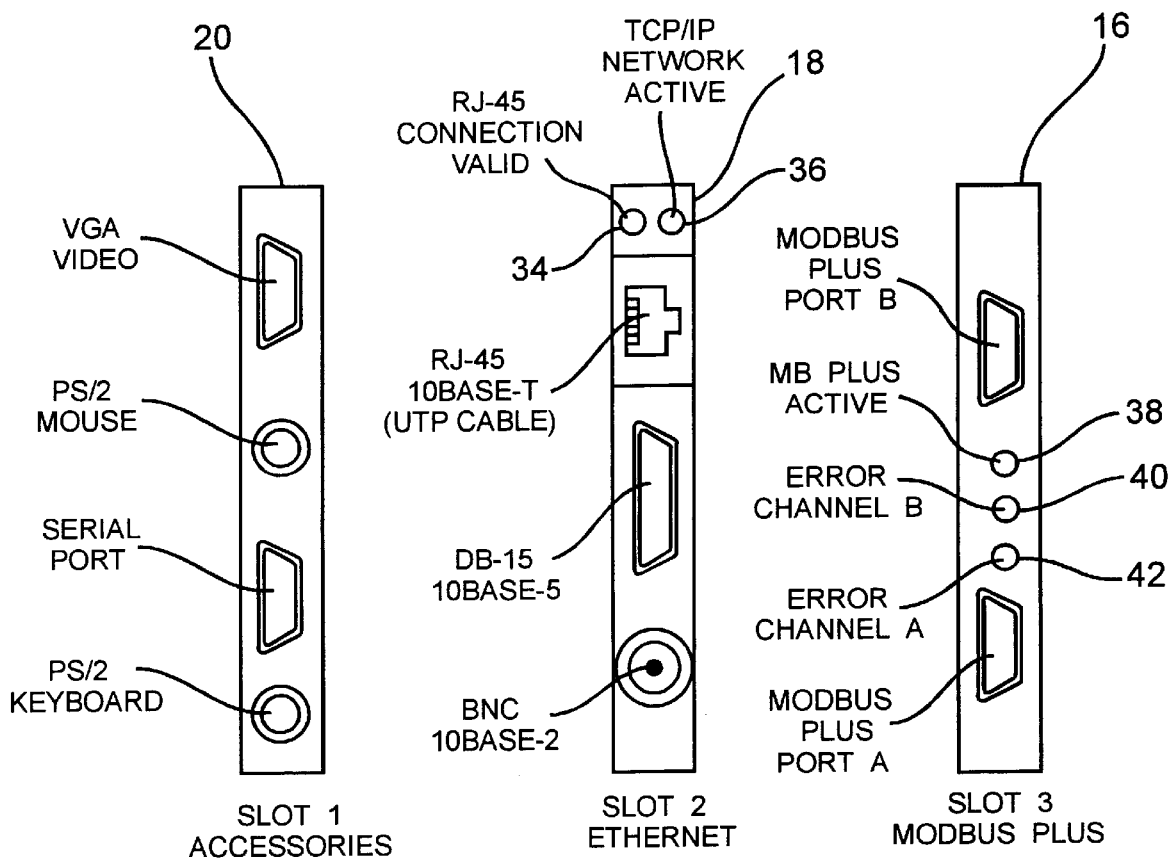
FIG. 7 is an elevated view of the connectors provided by the connector panel of FIG. 6.
Figure 8:
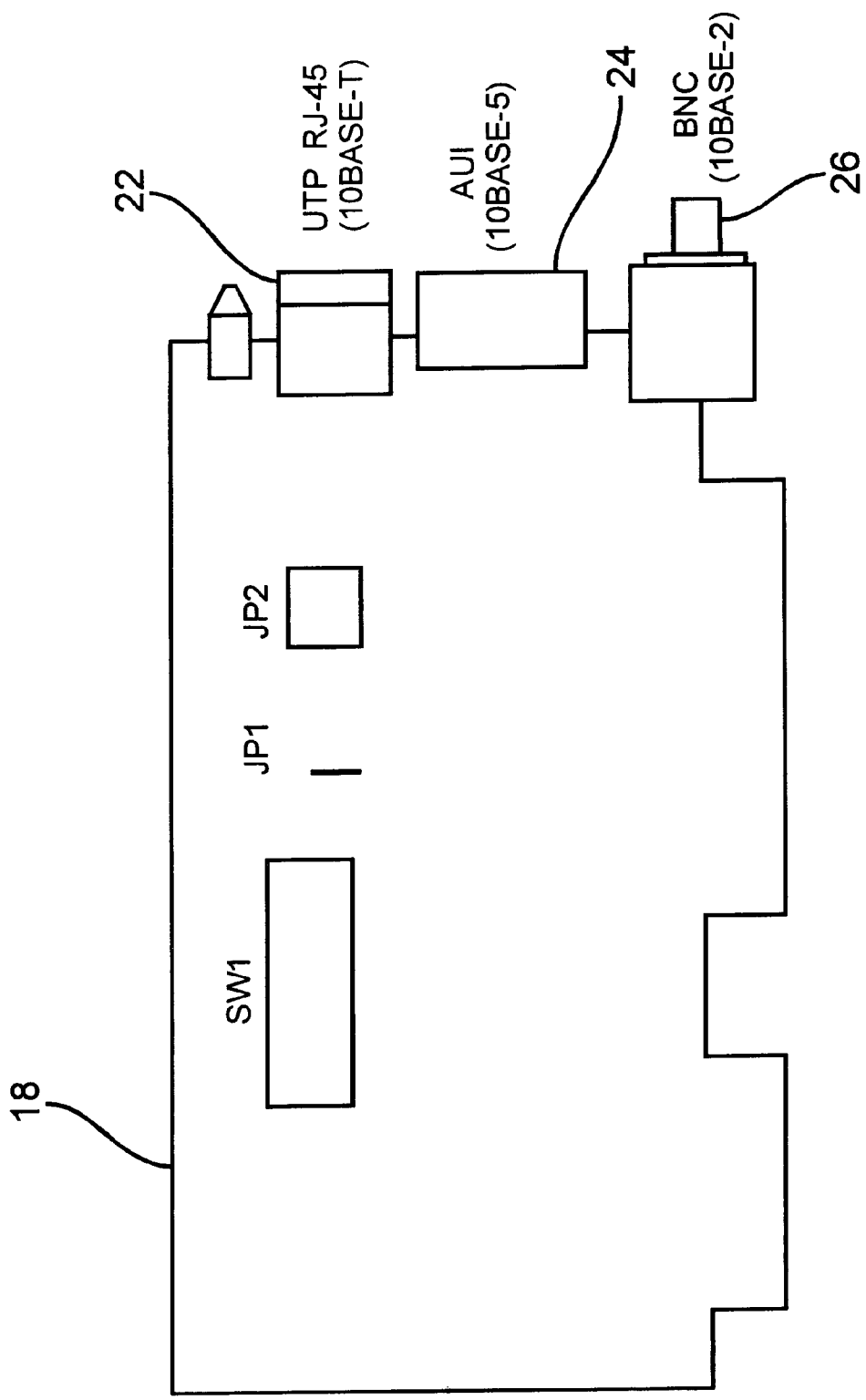
FIG. 8 is a simplified perspective side view of an Ethernet circuit board within the bridge of FIG. 6.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

As known by those having skill in the art, two types of messages can be initiated to MODBUS Plus nodes using MODBUS commands. Programming messages are used for logging into a node and controlling it, as in load/record/verify operations. Data access messages are used to read or write data at the node, or to get statistics from the node.

When a message transaction is initiated, a logical path is established between the originating node and the destination node. The path is maintained until the transaction is completed. The type of path that is set in each device is determined by the MODBUS command embedded in the message.

FIG. 1 summarizes the four possible types of MODBUS Plus paths, wherein the present invention supports each type comprising: Data Master (DM), Data Slave (DS), Program Master (PM), and Program Slave (PS).

An embodiment of the present invention shown in FIG. 2 has been built that supports up to eight paths for each type of path shown in FIG. 1. In this embodiment, the maximum amount of concurrent TCP/IP connections available is between 8 and 16, depending on the usage of paths in host applications. For example, up to 16 data connections can be active between TCP/IP hosts and MODBUS Plus nodes (a maximum of 8 active DM paths and 8 active DS paths). Up to 16 programming paths can be active (8 PM and 8 PS).

If MODSOFT software is being used, it sets both a PM and a DM path in the bridge for each active connection it maintains to a MODBUS Plus destination node. MODSOFT could be running on a single host, or simultaneously on multiple hosts. Thus, up to eight TCP/IP connections can be maintained with Modsoft running on one to eight hosts.

FIG. 3 summarizes the MODBUS function codes which open DM and DS paths in the respective nodes. Devices which use the MODBUS protocol accept incoming requests for data or statistics. They reply by returning either a normal or an exception response. The MODBUS function code in the request from an originating node always contains a most significant bit value of 0 (zero). In a normal MODBUS response, the function code of the originating request is echoed followed by any requested data or statistics. In an exception response, the most significant bit is set to 1 (one) to indicate an error, and the next byte contains an exception code showing the reason for the error.

FIG. 4 summarizes the MODBUS exception codes which may be returned by the bridge to the originating node.

Turning to FIGS. 5–8, bridge 10 includes a housing 12 enclosing a power supply 14 and a board set including a MODBUS circuit board 16, an Ethernet circuit board 18, a Central Processing Unit (CPU) circuit board 20 with memory, and a backplane 22.

The bridge housing 12 preferably consists of sheet metal and is wall mountable. The circuit boards are mounted within the bridge 10 in IBM style board guides (not shown). All connectors are mounted to the side of the housing. They include three Ethernet 10 BASE connectors, two MODBUS Plus connectors, a keyboard plug, a video plug, a mouse plug, and a power cord plug.

The above listed circuit boards for the bridge 10 preferably consist of off the shelf components. In an embodiment, the CPU circuit board 20 preferably contains a 486DX 100 Mhz CPU, or better, on board keyboard interface, and a local VGA display controller (MB display memory). In addition, the Ethernet circuit board 18 consists of a standard ISA bus Ethernet board with a 10 BASE T unshielded connector to provide Ethernet connectivity. Moreover, the Modbus Plus circuit board 16 consists of a SA85-002 board by Schneider Automation Incorporated. Further, power for the boards is supplied by an open frame 60 watt single output switching power supply 14.

In an alternative embodiment, the bridge 10 consists of a conventional personal computer having an Ethernet circuit board and a MODBUS Plus circuit board operably attached thereto.

The MODBUS Plus node address for the Modbus circuit board 16 preferably is set before installing the bridge 10 on the networks. The address is set by switches (not shown) on the MODBUS Plus circuit board 16. The MODBUS Plus node should have a unique address on the network with a default address of 1, but can be set from 1 to 64.

Likewise, the type of physical connection used to connect the bridge to the Ethernet should be set. The type of physical connection is set by internal Ethernet connector jumper JP2 on the Ethernet circuit board 18 to define the type of physical connection. Preferably, as stated above, the bridge 10 provides three connectors comprising: connector 22 for an IEEE 802.3 10Base-T unshielded twisted pair cable (UTP RJ45); connector 24 for an IEEE 802.3 10Base-5 thick cable (AI DB-155); and connector 26 for an IEEE 802.3 10Base-2 thin cable (BNC). Likewise, the jumper JP2 has two positions wherein the first position enables both the RJ-45 and the BNC connectors 22, 26 and the second position enables the AUI connector 24.

If the bridge 10 is being installed at a site that must meet CE requirements, and the 10Base-T (RJ-45) connector 22 is being used, a ferrite bead should be installed on the Ethernet cable at the RJ-45 connector. For example, ferrite bead part number 28A2029-0A0 from Steward in Livingston, Scotland, UK.

The bridge 10 can be physically installed on a vertical wall panel or a horizontal shelf using conventional mounting brackets. However, clearance should be provided for ventilation and access to the bridge's rear panel connectors and indicators.

The power supply 14 is connected to a power input providing either about 110 or 220 V ac. When the power supply 14 is enabled to supply power to the board set within the bridge housing 12 by toggling switch 30, light emitting diode 32 (LED) is illuminated to show that power is applied to the bridge 10.

Ethernet and MODBUS LEDs are also provided for verifying the operation of the bridge 10. In particular, the Ethernet board 18 has an indicator 34 for showing a valid connection between the board's RJ-45 (UTP) jack and the network. The Ethernet board also has another indicator 36 that flashes to show the bridge's communication activity on the Ethernet link.

Likewise, the MODBUS Plus board 16 has an indicator 38 that flashes a repetitive pattern to show its network communication status, plus two indicators 40, 42 which identify communication errors on the two MODBUS Plus cable paths. As such, one error indicator is lit normally in single-cable installations, showing that a second cable does not exist.

Loaded into the memory of the bridge CPU circuit board 20 is application software. Also, a host software storage media such as a diskette or compact disk (CD) can be provided containing files for managing the bridge application from a remote host Personal Computer.

The files loaded into the bridge 10 preferably include the following files: COMMAND.COM for DOS command interpretation; AUTOEXEC.BAT for bridge initialization at startup; CONFIG.SYS also for bridge initialization at startup; GATELOOP.BAT for running the bridge application; SGATE.EXE containing the bridge application program; BDREST.EXE for initializing the MODBUS Plus board; MBPHOST.SYS containing the driver for the MODBUS board; CFGUTIL.EXE for configuring the bridge IP setup, MODBUS Plus and TCP mapping; CFGUTIL.HLP for providing a help screen for CFGUTIL.EXE; MBP-STAT.EXE containing diagnostic tools for the MODBUS Plus network connection; PING.EXE containing diagnostic tools for the Ethernet network connection; TCPINFO.EXE containing diagnostic tools for Bootstrap sever communication; WATTCP.CFG containing the bridge's IP setup and network parameters; and PNPPD.COM containing the Ethernet packet driver.

Moreover, the host software media preferably contains: the above-mentioned CFGUTIL.EXE and CFGUTIL.HLP files in addition to a file entitled DWNLD.EXE comprising a download program for the host, and a README file containing text with current release information and application notes.

The CFGUTIL.EXE file configures and writes ASCII text files that records the bridge's current configuration and network mapping. The ASCII files are retained in the bridge memory and referenced for configuration on subsequent startups. These files also can be uploaded and stored in the host for restoring the bridge's configuration if needed.

On power-up of the bridge 10, the software is executed in a preferred sequence wherein: CONFIG.SYS loads the MODBUS Plus driver MBPHOST.SYS; AUTOEXEC.BAT calls GATELOOP.BAT; GATELOOP.BAT executes BDRESET.EXE, initializing the MODBUS Plus board; GATELOOP.BAT executes the Ethernet driver program PNPPD.COM; and GATELOOP.BAT executes the bridge application program SGATE.EXE.

Preferably, the bridge 10 is configured either by using a Bootstrap server or the CFGUTIL program. If a Bootstrap sever is used, the server should be configured to recognize the bridge 10 by using the Media Access Control (MAC) address of the bridge. As such, the Bootstrap server associates the bridge's MAC address with a unique IP address assigned to the bridge. When the bridge 10 is initially powered up, it preferably attempts for 30 seconds to connect to the Bootstrap server. If the server is found, the bridge 10 automatically configures for the Ethernet connection. However, mappings between Ethernet and MODBUS Plus devices must be manually entered as described in detail later herein, or a host file can be created and downloaded for centralized mapping.

Figure 9:
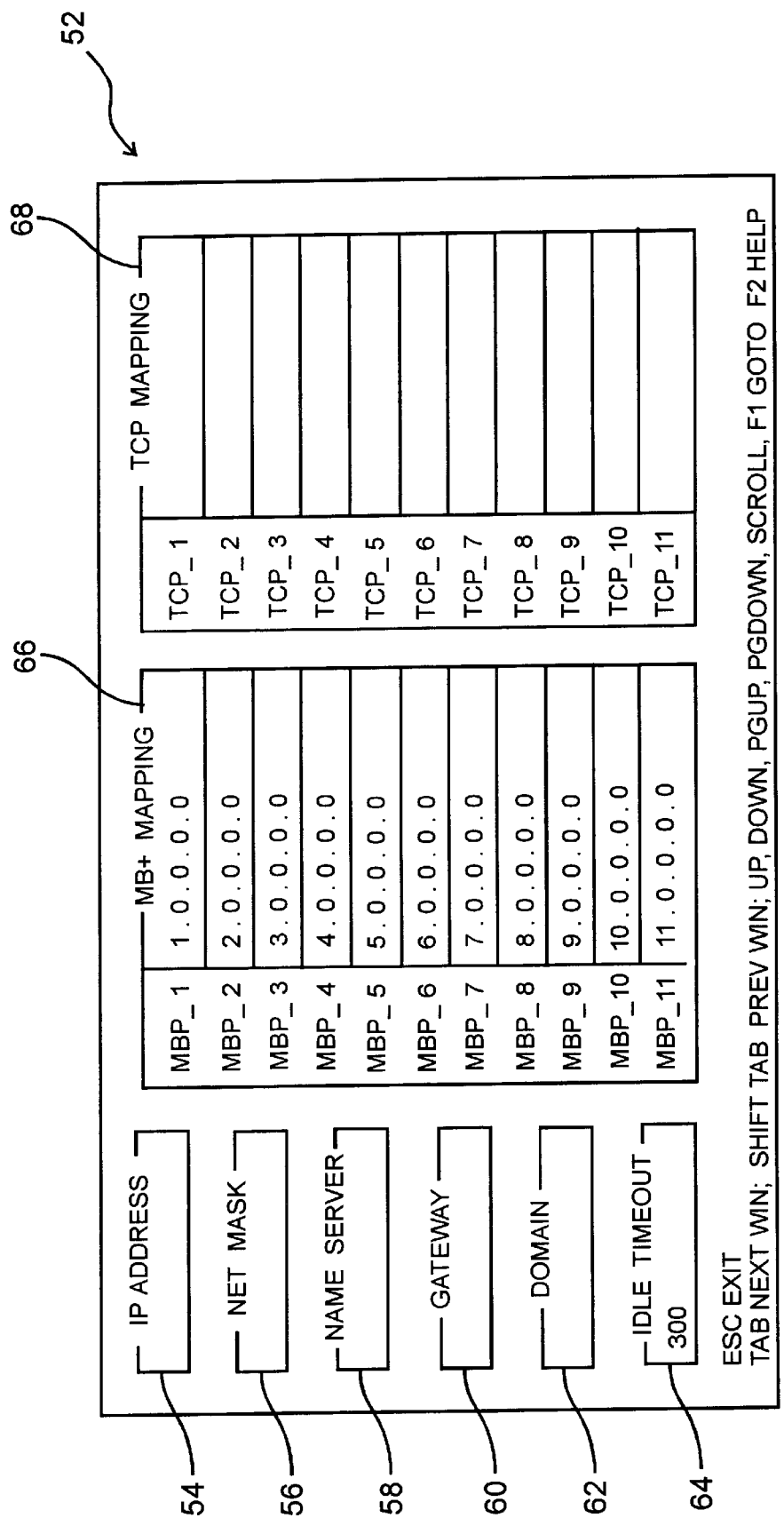
FIG. 9 depicts a menu provided by the bridge of FIG. 5 upon execution of a configuration program.

As stated above, if a Bootstrap server is not used, preferably the CFGUTIL program is used to configure the bridge 10 along with the keyboard 46, mouse 48, and VGA monitor 50 operably attached thereto. The menu shown in FIG. 9 is provided on the display of the monitor 50 by execution of the CFGUTIL program. The menu 52 provides five fields preferably comprising: Internet Protocol (IP) Address 54; Net Mask 56; Name Server 58, Gateway 60, Domain 62, and Idle Timeout 64.

In the preferred embodiment, the IP address and the Net Mask fields 54,56 are required for the bridge 10 to function properly. Further, the Name Server 58, Gateway 60, Domain 62 and Idle Timeout 64 are either optional or required, according to the desired application.

The bridge 10 provides an Idle Timeout default value of 300 seconds (5 minutes). This value specifies the amount of time the bridge 10 maintains Data Master and Data Slave paths open without active data transfers. If this time elapses, all Data paths are closed. The default value can be retained or a new one entered.

The bridge 10 also uses the MODBUS Plus and Transport Control Protocol mappings 66 and 68 located in the center of the menu 52, to forward messages between the networks. In particular, the mappings 66,68 define the routing destinations for messages received by the bridge 10 on one network and passed through it to destinations on the other network.

The bridge 10 uses mapped routing for TCP/IP to MODBUS Plus transfers and dynamic message routing for messages initiated from TCP/IP hosts.

Each MODBUS Plus message destination is defined by a five-byte MODBUS Plus routing path. The use of the path is specific to each type of MODBUS Plus device. Messages received by the bridge 10 from Ethernet host nodes contain an embedded Destination Index byte in the range 1 . . . 255 decimal. This byte corresponds to the dest_idx field in messages constructed by MODICON panel software such as CONCEPT and MODSOFT.

In mapped routing, the bridge uses Destination Indexes 1 . . . 249 to map messages from the TCP/IP node to a MODBUS destination node. The bridge maps Destination Indexes in this range to one of 249 possible MODBUS Plus routing paths. Each Destination Index value maps to a location in a MODBUS Plus mapping table, which contains a five-byte MODBUS Plus routing path to the destination node. Accordingly, the bridge 10 configuration includes entries made into the bridge's mapping table to correlate the Destination Indexes with routing paths for MODBUS Plus nodes in a given application.

Destination Indexes 0 and 254 are used for dynamic routing of messages by the bridge. Dynamic routing preferably applies to messages initiated from TCP/IP hosts, and requires the host to configure the bridge (to destination Index 255). In an embodiment, Destination Index 0 applies to host-based routing and Destination Index 254 applies to socket-based routing.

In host-based routing, a MODBUS Plus routing path is available in the bridge at index location 0 for runtime use by TCP/IP. When the hosts configures a path in the bridge, any message from that host addressed to index 0 is routed to that MODBUS Plus path. The bridge maintains a cache of up to 10 associations between TCP/IP hosts and MODBUS Plus paths. This routing option allows the bridge to be configured for simple addressing to MODBUS Plus from TCP/IP nodes which do not support gateway routing.

In socket-based routing, a MODBUS Plus routing path is available in the bridge preferably at index location 254 for the current TCP/IP host connection only. The bridge maintains one socket connection at that index location for each of its eight Program and eight Data paths. This routing option allows the bridge to handle concurrent sessions from one TCP/IP host, or from multiple hosts, using independent routing assignments. It provides flexibility for an application to manage routing dynamically, in addition to the bridge's fixed mapping table.

Destination Index 255 relates to commanding the bridge 10. Messages received by the bridge 10 addressed to Destination Index 255 cause the bridge to execute an internal operation. This index is used to configure the bridge 10 for dynamic routing, or to invoke an upload or download operation between the host and bridge.

During the design of a user application, a Destination Index value (1 . . . 249) should be defined for each MODBUS Plus node that the Ethernet host originates messages to. This is accomplished by editing the bridge's mapping table to correlate each Destination Index value to the five-byte routing path of the intended MODBUS Plus node.

The MODBUS Plus Mapping table 66 contains 249 fields, labeled MBP_1 through MBP_249. These fields define MODBUS Plus routing paths for messages from TCP/IP hosts which contain Destination Indexes 1 through 249 decimal.

Figures 10, 12:
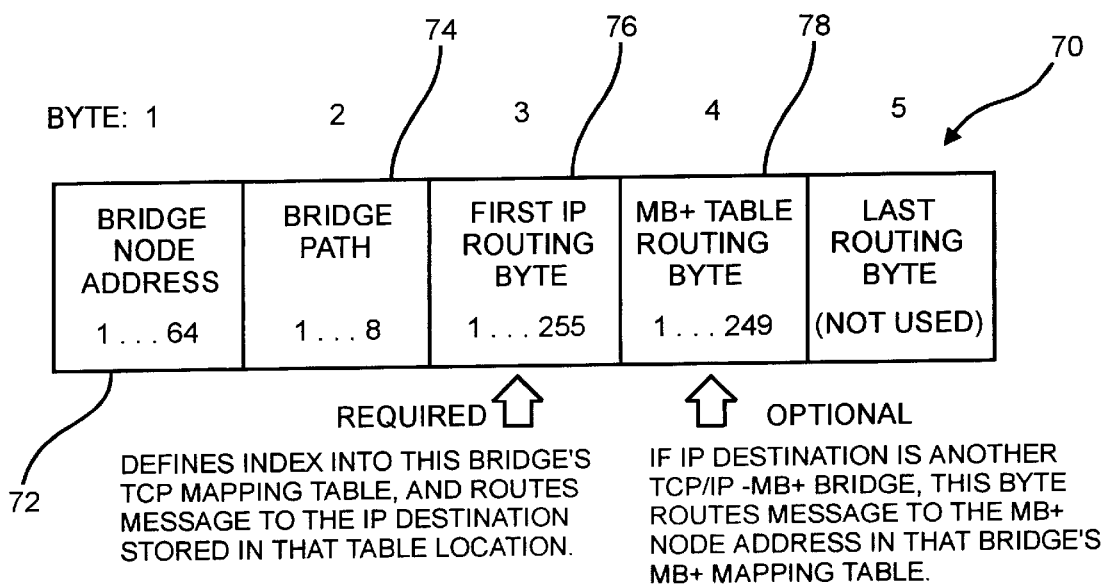
FIG. 10 illustrates, for the bridge of FIG. 5, default MODBUS Plus routing paths for Destination Indexes.
FIG. 12 depicts a five-byte routing path field within a message received by the bridge of FIG. 5 from a MODBUS Plus node.

The default MODBUS Plus routing paths for Destination Indexes is shown in FIG. 10. For example, the default entry in field MBP_1 specifies that TCP/IP messages intended for dest_idx value 1 are routed to MODBUS Plus node 1 on the local MODBUS Plus network (the same network that contains the bridge).

Figure 11:
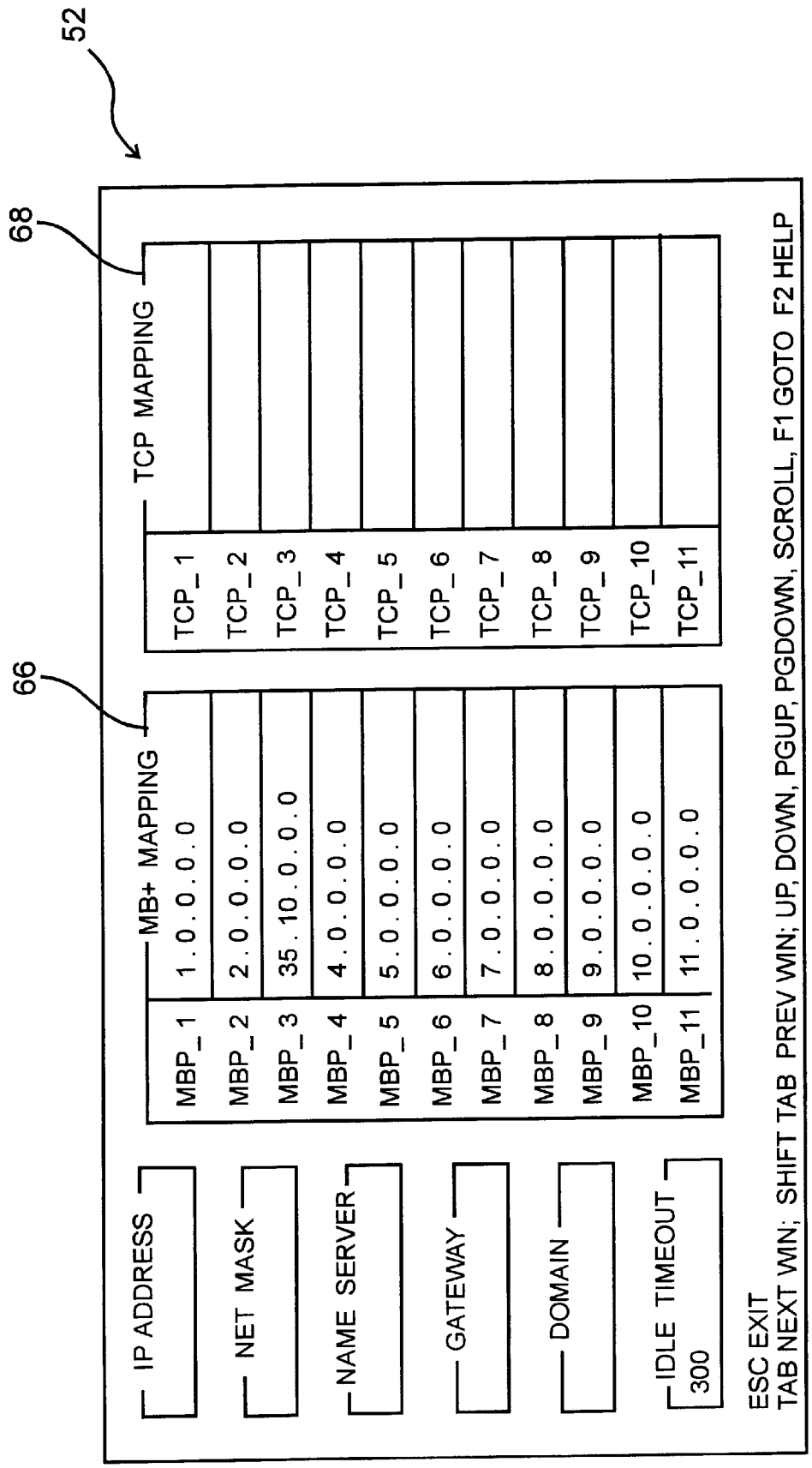
FIG. 11 depicts an example of the bridge's default mapping with one custom entry made by a user.

FIG. 11 depicts an example of the bridge's default mapping, with one custom entry made by a user. In FIG. 11, entry MBP_3 shows an example of custom routing to the MODBUS Plus path 35.10.0.0.0. In this example, incoming TCP/IP messages containing dest_idx value 3 will cause the bridge to index into table location 3, and to use these contents for routing the message to MODBUS Plus. Messages will be routed through a Bridge Plus node at address 35 on the local MODBUS Plus network, and forwarded to a destination node at address 10 on a second network.

The bridge 10 also uses mapping for MODBUS Plus to TCP/IP transfers. The bridge contains an internal MODBUS Plus to TCP mapping table 68 with 255 entry fields, each containing an IP address. Each message received by the bridge 10 from a MODBUS Plus node contains a five-byte routing path field 70 as shown in FIG. 12.

The first byte 72 in a message 70 initiated from a MODBUS Plus node to the bridge 10 addresses the bridge. The second byte 74 opens a path within the bridge.

The third byte 76 corresponds to the dest_idx field in MODBUS commands. This byte indexes the bridge's Transport Control Protocol Mapping table 68. The bridge 10 extracts the IP address at that table location and forwards the message to the IP destination.

The fourth byte 78 allows the Ethernet network to operate as a link between two or more bridges and their respective MODBUS Plus networks. If the IP destination (from the byte 3 table index) is not another bridge, the fourth byte is not used.

Figure 13:
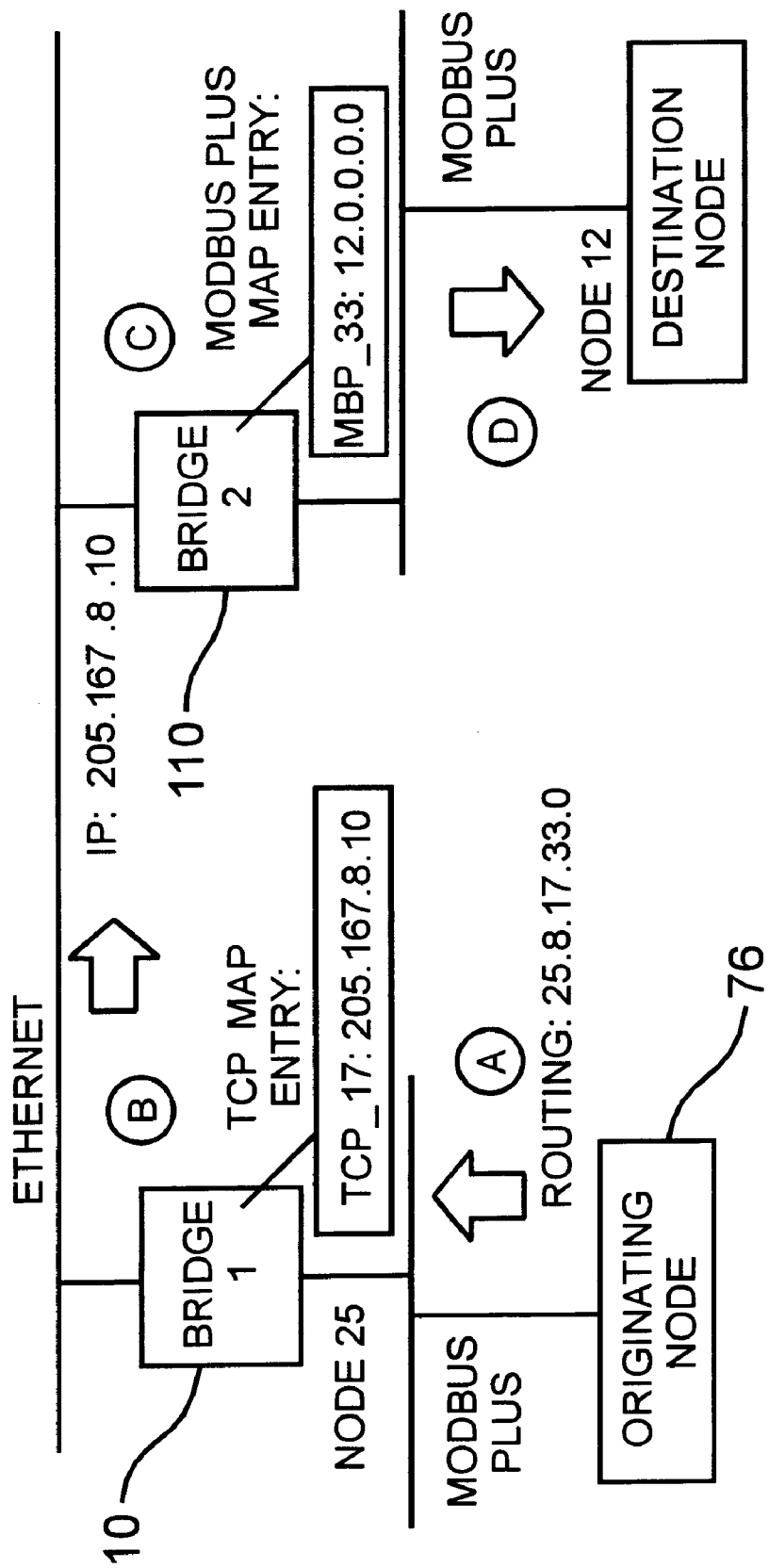
FIG. 13 shows the mapping of a message between two MODBUS Plus nodes via a pair of Ethernet bridges depicted in FIG. 5.

If the IP destination is another bridge, that bridge uses the fourth byte to index into its MODBUS Plus Mapping table. It extracts a MODBUS Plus routing path from the table and forwards the message to a destination node on its own MODBUS Plus network. FIG. 13 shows an example of the mapping of a message between two MODBUS Plus nodes through a pair of Ethernet bridges.

First, with respect to FIG. 13, a message is originated. In particular, a MODBUS Plus node 76 originates the message with the five-byte MODBUS Plus path 25.8.17.33.0. The message is addressed to bridge 10 at node address twenty five ("25"), specified in the first routing byte 72. Bridge 10 (node "25") receives the message and opens its internal path eight ("8"), as specified in the second routing byte 74.

Next, bridge 10 (node "25") maps the message to TCP/IP. Bridge 10 (node "25") indexes into its TCP Mapping table 68 at location TCP_17, specified by the third routing byte 76. Location seventeen ("17") contains the IP address 205.167.8.10. The bridge 10 forwards the message to this IP address, a second bridge 110 that is identical in construction to bridge 10.

Figure 15:
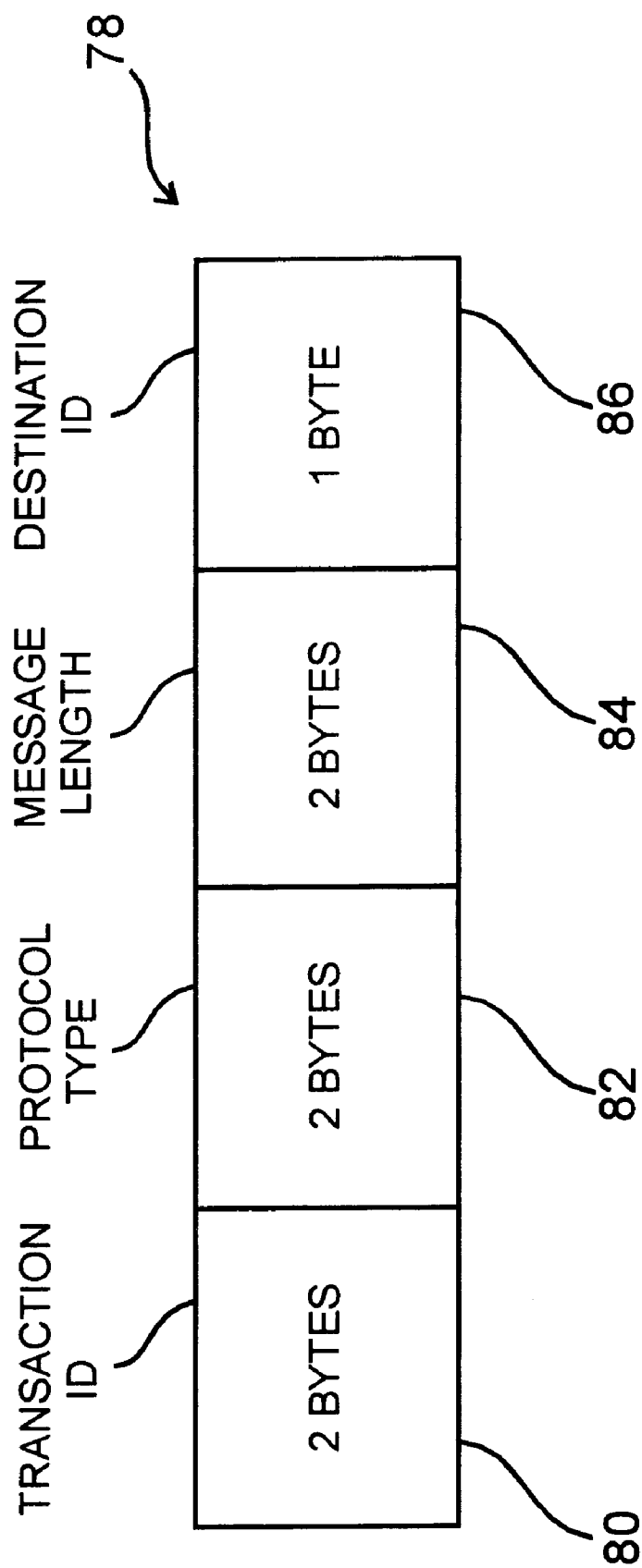
FIG. 15 depicts a MODBUS Application Protocol Header having four field comprising a transaction ID, protocol type, message length, and destination ID.

Bridge 110 maps the message to MODBUS Plus. Bridge 110 receives the message and indexes into its MODBUS Plus Mapping table 66 at location MBP_33, specified by the fourth byte 68 of routing in the original message which is transmitted by Bridge 10 across the Ethernet as the destination ID in the MODBUS Application Protocol Header. As shown in FIG. 15, the seven byte MODBUS Application Protocol Header 78 has four fields comprising, respectively, a two byte transaction ID 80, a two byte protocol type 82, a two byte message length 84, and a one byte destination ID 86.

Turning back to FIG. 13, location thirty-three ("33") contains the MODBUS Plus routing path 12.0.0.0.0 to a node on the MODBUS Plus network at Bridge 110.

Lastly, the message is delivered. The message is delivered to the destination, node "12," on the MODBUS Plus network. The node acts upon the MODBUS command embedded in the message.

As stated previously, each message from a MODBUS Plus node contains a five-byte routing path field 70. The bridge 10 uses the third byte 76 to index into its TCP Mapping table 68, extracting an IP address from that entry.

If desired, the table 68 to map the MODBUS Plus routing path's third byte 76 can be edited to specific IP addresses. The TCP Mapping table 68 contains 255 fields, labeled TCP_1 through TCP_255. These fields define IP addresses for messages (from MODBUS Plus nodes) which contain 1 through 255 decimal in the third byte 76 of the MODBUS Plus message routing path.

By default, the bridge 10 automatically sets the first three byes of each IP address to match the first three bytes of the bridge's Internet Protocol address. The bridge sets the fourth byte of the Internet Protocol address mapping to the range 1 . . . 255. For example, if the bridge's IP address 54 is user configured as 205.167.7.65, then the TCP Mapping table's 255 locations automatically default to: TCP_1:205.167.7.1, TCP_2:205. 167.7.2 . . . and,TCP_255: 205.167.7.255

FIG. 14 illustrates an example of typical default Transport Control Protocol mapping, with one custom routing entry made by the user at location TCP_10. Accordingly, the location TCP_10 is indexed by the bridge 10 when it receives a message from a MODBUS Plus node with contents 10 in the MODBUS Plus routing path third byte 76. The bridge 10 extracts the Internet Protocol address 205.167.99.99 at the table location, and routes the message to that IP address.

The present application is being filed contemporaneously with a U.S. patent application Ser. No. 09/166,870, both of which are, or will be, assigned to Schneider Automation, where the other application is incorporated herein by reference to the extent necessary for the understanding of the present invention.

While the specific embodiments have been illustrated and described, numerous modifications come to mind without significantly departing from the spirit of the invention and the scope of protection is only limited by the scope of the accompanying claims.

We claim:

1. A bridge for providing a connection between a local area network and an Ethernet network comprising:

a local area network circuit board operably coupled to the local area network for receiving a message from an originating node having a routing path field;

a CPU operably connected to the circuit board for extracting a table location in response to the routing path field; and, an Ethernet circuit board operably connected to the CPU and the Ethernet network for forwarding the message to an IP destination in response to the table wherein the Ethernet circuit board receives a message from the Ethernet network, the message having an IP address and an embedded destination index byte, and the local area network board delivering the message received from the Ethernet network to a destination node on the local area network in response to the destination index byte.

2. The bridge of claim 1, wherein the CPU provides for mapping the embedded destination index byte to correspond with the destination node.

3. The bridge of claim 1, wherein the Ethernet circuit board is operably connected to another bridge for receiving the message and delivering the message to a destination node in response the routing path field.

4. The bridge of claim 1, wherein the CPU maintains at least two internal mapping tables between IP addresses and addresses of the local area network.

5. The bridge of claim 4, wherein a keyboard is operably connected to the CPU for configuring the mapping tables from a local keyboard.

6. The bridge of claim 4, wherein the CPU downloads the mapping tables from an Ethernet host.

7. A method for providing a connection between a local area network and an Ethernet network comprising the steps of:

receiving a message from an originating node on the local area network having a five-byte routing path field;

opening a path between the local area network and the Ethernet network in response to a second byte within the routing path field;

extracting a table location in response to the second byte within the routing path field;

forwarding the message to an IP destination on the Ethernet network in response to the table location and a one byte destination identification within a header transmitted on the Ethernet network;

receiving another message from the Ethernet network, the message having an IP address and an embedded destination index byte; and delivering the message received from the Ethernet network to a destination node on the local area network in response to the destination index byte.

8. The method of claim 7, further including the step of mapping the embedded destination index byte to correspond with the destination node.

9. The method of claim 7, further including the steps of receiving the message from the Ethernet network and delivering the message to a destination node in response to a fourth byte within the routing path field.

10. The method of claim 7, further including the step of loading a program onto a personal computer for extracting the table location in response to the second byte within the routing path field.

11. The method of claim 7, further including the step of maintaining at least two internal mapping tables between IP addresses and addresses of the local area network.

12. The method of claim 11, further including the step of configuring the mapping tables from a local keyboard.

13. The method of claim 12, further including the step of downloading the mapping tables from an Ethernet host.

14. The method of claim 7, further including the step of closing the path between the local area network and the Ethernet network.

15. A method for providing a connection between a local area network and an Ethernet network comprising the steps of:

receiving a message from a originating node on the local area network having a five-byte routing path field;

opening a path between the local area network and the Ethernet network in response to a second byte within the routing path field;

extracting a table location in response to a second byte within the routing path field;

forwarding the message to an IP destination on the Ethernet network in response to the table location; and receiving another message from the Ethernet network, the message having an IP address and an embedded destination index byte, and delivering the message received from the Ethernet network to a destination node on the local area network in response to the destination index byte.

16. A method for providing a connection between a local area network and an Ethernet network comprising the steps of:

receiving a message from a originating node on the local area network having a five-byte routing path field;

opening a path between the local area network and the Ethernet network in response to a second byte within the routing path field;

extracting a table location in response to a second byte within the routing path field;

forwarding the message to an IP destination on the Ethernet network in response to the table location; and, mapping the embedded destination index byte to correspond with the destination node.

17. A method for providing a connection between a local area network and an Ethernet network comprising the steps of:

receiving a message from a originating node on the local area network having a five-byte routing path field;

opening a path between the local area network and the Ethernet network in response to a second byte within the routing path field;

extracting a table location in response to a second byte within the routing path field;

forwarding the message to an IP destination on the Ethernet network in response to the table location; and, receiving the message from the Ethernet network and delivering the message to a destination node in response to a fourth byte within the routing path field.

18. The method of claim 15, further including the step of loading a program onto a personal computer for extracting the table location in response to the second byte within the routing path field.

19. The method of claim 17, further including the step of maintaining at least two internal mapping tables between IP addresses and addresses of the local area network.

20. The method of claim 19, further including the step of configuring the mapping tables from a local keyboard.

21. The method of claim 19, further including the step of downloading the mapping tables from an Ethernet host.

22. A bridge for providing a connection between a MODBUS Plus network and an Ethernet network comprising:

a MODBUS Plus circuit board operably coupled to the MODBUS Plus network for receiving a message from an originating node; a CPU operably connected to the MODBUS circuit board for extracting a table location in response to the routing path field; and, an Ethernet circuit board operably connected to the CPU and the Ethernet network for forwarding the message to an IP destination in response to the table location wherein the routing path field has five bytes, and the CPU extracts the table location in response to a third byte with the routing path field, the third byte having an address range of from 1 to 255.

23. The bridge of claim 25, wherein the Ethernet circuit board is operably connected to another bridge for receiving the message and delivering the message to a destination node in response to a fourth byte within the routing path field.

24. A dynamically configurable bridge operably connected between an Ethernet network host and a local area network, the bridge comprising:

a configuration destination index; and, an application responsive to a message received at the configuration destination index from the host; and, a dynamic destination index utilized by the application for configuring the bridge for dynamic routing.

25. The bridge of claim 24 further comprising the dynamic routing being host-based wherein the bridge can be configured by the host for simple addressing to the local area network.

26. The bridge of claim 24 further comprising the dynamic routing being socket-based wherein the bridge is capable of handling concurrent sessions from one or more hosts utilizing independent routing assignments.

* * * * *